(12) United States Patent
Steinberg et al.

(10) Patent No.: US 11,755,759 B2
(45) Date of Patent: Sep. 12, 2023

(54) METHOD FOR SECURING DATA UTILIZING MICROSHARD™ FRAGMENTATION

(71) Applicant: SHARDSECURE, INC., New York, NY (US)

(72) Inventors: Louis Steinberg, Yorktown Heights, NY (US); Chihli Lu, Jersey City, NJ (US)

(73) Assignee: SHARDSECURE, INC., New York, NY (US)

( * ) Notice: Subject to any disclaimer, the term of this patent is extended or adjusted under 35 U.S.C. 154(b) by 360 days.

(21) Appl. No.: 16/625,183

(22) PCT Filed: Aug. 7, 2018

(86) PCT No.: PCT/US2018/045563
§ 371 (c)(1),
(2) Date: Dec. 20, 2019

(87) PCT Pub. No.: WO2019/032556
PCT Pub. Date: Feb. 14, 2019

(65) Prior Publication Data
US 2020/0143074 A1 May 7, 2020

Related U.S. Application Data

(60) Provisional application No. 62/543,781, filed on Aug. 10, 2017.

(51) Int. Cl.
*G06F 21/62* (2013.01)
*H04L 67/1097* (2022.01)

(52) U.S. Cl.
CPC ...... *G06F 21/6218* (2013.01); *H04L 67/1097* (2013.01)

(58) Field of Classification Search
CPC ............ G06F 21/6218; H04L 67/1097
(Continued)

(56) References Cited

U.S. PATENT DOCUMENTS 4,951,193 A * 8/1990 Muramatsu ............ G06F 8/451
711/206
6,094,434 A * 7/2000 Kotzur .................. H04L 49/351
370/429
(Continued)

FOREIGN PATENT DOCUMENTS

CN 101374233 A * 2/2009 ........... H04N 19/132
CN 101458946 A * 6/2009 ....... G11B 20/00086
(Continued)

OTHER PUBLICATIONS

Kim. "Design Strategy for Enhancing Adoption of Manufacturing Big Data System (MBDS) in Korean Small and Medium-Sized Manufacturing Firms (SMMFs)." In Proceedings of the 2015 International Conference on Big Data Applications and Services, pp. 184-188. 2015. (Year: 2015).*
(Continued)

*Primary Examiner* — Luu T Pham
*Assistant Examiner* — Walter J Malinowski
(74) *Attorney, Agent, or Firm* — William A. Hector; Venable LLP

(57) ABSTRACT

A set of methods are proposed to increase data security, both in motion and at rest, by creating microshard data fragments. Microshard data fragments are subsets of a data file which are smaller than a defined atomic unit of value (e.g. a fraction of the size of a social security number or valuable password that one seeks to protect). These microshard data fragments are then dispersed across several physical locations, obscuring the value. Additional techniques are pro-
(Continued)

posed to further frustrate unauthorized reassembly attempts and to create system efficiencies.

18 Claims, 9 Drawing Sheets

(58) Field of Classification Search
USPC .......................................................... 713/193
See application file for complete search history.

(56) References Cited

U.S. PATENT DOCUMENTS

| | | | |
|---|---|---|---|
| 6,233,242 B1* | 5/2001 | Mayer | H04L 49/103 370/392 |
| 6,256,723 B1* | 7/2001 | Hudson | G06F 12/0284 711/E12.013 |
| 6,338,114 B1* | 1/2002 | Paulsen | G06F 3/0683 711/112 |
| 6,633,892 B1* | 10/2003 | Chan | G06F 9/465 |
| 7,031,904 B1* | 4/2006 | Wilson | H04L 67/1097 709/236 |
| 7,562,232 B2* | 7/2009 | Zuili | H04L 63/04 713/193 |
| 8,595,512 B2* | 11/2013 | Liu | H04L 9/0894 380/37 |
| 8,930,226 B1* | 1/2015 | Kerr | G16H 15/00 705/3 |
| 9,292,700 B2* | 3/2016 | Parker | G06F 21/6209 |
| 9,405,926 B2* | 8/2016 | Lewis | G06F 3/067 |
| 9,450,923 B2* | 9/2016 | Klum | G06F 11/1464 |
| 9,729,525 B1* | 8/2017 | Koi | G06F 16/951 |
| 9,779,101 B2* | 10/2017 | Klum | G06F 16/116 |
| 9,917,820 B1* | 3/2018 | Koi | H04L 63/0428 |
| 10,043,017 B2* | 8/2018 | Lewis | G06F 3/067 |
| 10,984,116 B2* | 4/2021 | Lewis | H04L 9/14 |
| 11,126,735 B1* | 9/2021 | Ketharaju | G06F 21/6218 |
| 2002/0188836 A1* | 12/2002 | Gurumoorthy | G06F 9/4406 713/1 |
| 2002/0199199 A1* | 12/2002 | Rodriguez | H04N 19/127 348/718 |
| 2003/0004982 A1* | 1/2003 | Brandon | G06Q 10/10 715/201 |
| 2003/0074419 A1* | 4/2003 | VanderDrift | G06F 16/88 709/218 |
| 2004/0148634 A1* | 7/2004 | Arsenault | H04N 21/44016 725/89 |
| 2004/0268109 A1* | 12/2004 | Rothman | G06F 9/4401 713/1 |
| 2005/0018693 A1* | 1/2005 | Dull | H04L 45/50 370/396 |
| 2005/0289189 A1* | 12/2005 | Nettleton | G06F 16/2343 |
| 2006/0123162 A1* | 6/2006 | Beshai | H04L 49/103 710/58 |
| 2007/0282591 A1* | 12/2007 | Peng | G06F 40/295 704/3 |
| 2009/0161870 A1* | 6/2009 | Rosenberg | G06F 21/6218 380/268 |
| 2009/0203409 A1* | 8/2009 | Castor | G06F 1/3215 455/574 |
| 2010/0030820 A1* | 2/2010 | Memon | G06F 16/10 |
| 2010/0082594 A1* | 4/2010 | Bhat | G06F 16/951 707/E17.014 |
| 2010/0162001 A1* | 6/2010 | Dodgson | H04L 67/1097 713/193 |
| 2010/0302919 A1* | 12/2010 | Ling | G11B 20/1879 |
| 2011/0099610 A1* | 4/2011 | Doora Prabhuswamy | H04L 9/085 726/5 |
| 2011/0153364 A1* | 6/2011 | Kerr | G16H 40/67 705/3 |
| 2012/0066517 A1* | 3/2012 | Vysogorets | G06F 21/34 713/193 |
| 2012/0159197 A1* | 6/2012 | Orsini | H04L 9/3226 713/193 |
| 2012/0198241 A1* | 8/2012 | O'Hare | G06F 21/602 713/189 |
| 2012/0331088 A1* | 12/2012 | O'Hare | H04L 67/1097 709/214 |
| 2013/0018852 A1* | 1/2013 | Barton | G06F 16/162 707/E17.007 |
| 2013/0301820 A1* | 11/2013 | Williams | H04M 3/42195 379/201.01 |
| 2013/0325915 A1* | 12/2013 | Ukai | G06F 16/182 707/827 |
| 2014/0181987 A1* | 6/2014 | Patawaran | G06F 21/78 726/26 |
| 2014/0201541 A1* | 7/2014 | Paul | G06F 21/6245 713/193 |
| 2014/0281804 A1* | 9/2014 | Resch | H04L 67/06 714/763 |
| 2015/0006787 A1* | 1/2015 | Liu | G06F 3/0604 711/103 |
| 2015/0195371 A1* | 7/2015 | Nowakowski | G06F 3/04812 709/213 |
| 2016/0125196 A1* | 5/2016 | Klum | G06F 21/6218 726/28 |
| 2016/0342608 A1* | 11/2016 | Burshteyn | H04L 63/0428 |
| 2017/0116060 A1* | 4/2017 | Bandic | G06F 11/079 |
| 2017/0178012 A1* | 6/2017 | Borza | G06F 9/451 |
| 2018/0089224 A1* | 3/2018 | Muthuswamy | G06F 16/13 |
| 2018/0143939 A1* | 5/2018 | Fu | G06F 3/0604 |
| 2018/0288072 A1* | 10/2018 | Lipkey | H04L 63/145 |
| 2019/0163842 A1* | 5/2019 | Pal | G06F 16/9024 |
| 2021/0319375 A1* | 10/2021 | Noh | H04L 41/16 |

FOREIGN PATENT DOCUMENTS

| | | | | |
|---|---|---|---|---|
| CN | 102567522 A | * | 7/2012 | |
| CN | 104641365 A | * | 5/2015 | .......... G06F 11/1407 |
| EP | 2309700 | | 4/2011 | |
| EP | 2309700 A1 | * | 4/2011 | ......... G06F 21/6218 |
| EP | 3321846 A1 | * | 5/2018 | ........ G06F 17/30117 |
| WO | 2012026884 | | 3/2012 | |

OTHER PUBLICATIONS

Esiner, Ertem, Shun Hanli Hanley, and Anwitaman Datta. "DMZtore: A dispersed data storage system with decentralized multi-factor access control." In 2016 IEEE 36th International Conference on Distributed Computing Systems (ICDCS), pp. 757-758. IEEE, 2016. (Year: 2016).*

Venugopal, Srikumar, Rajkumar Buyya, and Kotagiri Ramamohanarao. "A taxonomy of data grids for distributed data sharing, management, and processing." ACM Computing Surveys (CSUR) 38, No. 1 (2006): 3-es. (Year: 2006).*

Stonebraker, Michael, Paul M. Aoki, Robert Devine, Witold Litwin, and Michael Olson. "Mariposa: A new architecture for distributed data." In Proceedings of 1994 IEEE 10th International Conference on Data Engineering, pp. 54-65. IEEE, 1994. (Year: 1994).*

Anane, Rachid, Sukhvir Dhillon, and Behzad Bordbar. "A distributed scheme for secure data access." In 20th International Conference on Advanced Information Networking and Applications—vol. 1 (AINA'06), vol. 2, pp. 5-pp. IEEE, 2006. (Year: 2006).*

European Patent Office (EPO), Communication, Supplementary Partial Search Report and Provisional Opinion for EP 18843172.0, dated Dec. 17, 2020, 14 pages.

Sung Cheal Byun, International Preliminary Report on Patentability for Int'l App No. PCT/US2018/045563, KIPO, dated Feb. 26, 2019, 4 pgs.

Sang Bum Chin, International Search Report for Int'l App. No. PCT/US2018/045563, KIPO, dated Nov. 30, 2018, 3 pgs.

Sang Bum Chin, Written Opinion of the International Searching Authority for Int'l App No. PCT/US2018/045563, KIPO, dated Nov. 30, 2018, 10 pgs.

* cited by examiner

Figure 2

| SSN= | Microshard Data Fragment 1 (MSDF1) |
|---|---|
| 1234 | MSDF2 |
| 5678 | MSDF3 |
| 9,US | MSDF4 |
| ER=T | MSDF5 |
| IM44 | MSDF6 |
| ,DOB | MSDF7 |
| =22J | MSDF8 |
| AN19 | MSDF9 |
| 65,I | MSDF10 |
| D=34 | MSDF11 |
| 567, | MSDF12 |
| PW=P | MSDF13 |
| ASSW | MSDF14 |
| ORD1 | MSDF15 |

FIGURE 4

| FILENAME: "ACCOUNT" | | | |
|---|---|---|---|
| Schema: 1 | | | |
| MSDF1 | DEST Q | FILE 4 | INDEX 3 |
| MSDF2 | DEST V | FILE 7 | INDEX 9 |
| MSDF3 | DEST R | FILE 1 | INDEX 200 |
| MSDF4 | DEST Q | FILE 3 | INDEX 1 |
| MSDF5 | DEST B | FILE 7 | INDEX 11 |
| MSDF6 | DEST V | FILE 1 | INDEX 2 |
| MSDF7 | DEST B | FILE 7 | INDEX 19 |
| MSDF8 | DEST A | FILE 1 | INDEX 1 |
| ⋮ | ⋮ | ⋮ | ⋮ |

| | |
|---|---|
| DEST Q | Local disk 4 |
| DEST V | Cloud Provider B |
| DEST R | Cloud Provider A |
| DEST S | UNUSED |
| DEST B | Storage Array 6 |
| DEST A | NAS 7 |

500

METHOD FOR SECURING DATA UTILIZING MICROSHARD™ FRAGMENTATION

CROSS-REFERENCE TO RELATED APPLICATIONS

This application is a national stage entry of Application No. PCT/US18/45563, entitled "Method for Securing Data Utilizing MicroShard Fragmentation" and filed on August 7, 2018, which claims the benefit of and priority to, under 35 U.S.C. 119(e), U.S. Provisional Patent Application 62/543,781, entitled "Method for Securing Data Utilizing MicroShard Fragmentation" and filed Aug. 10, 2017, the entire contents of the disclosures of which are hereby incorporated by reference in their entireties for all purposes.

FIELD OF INVENTION

Embodiments of the present invention relates to apparatuses, systems and methods for securing data through dispersion.

BACKGROUND

Currently, data protection is achieved using one of three methodologies and structures. Data can be made less accessible, for example by placing it on a protected server behind a firewall. Data can be made less understandable, by obfuscating it through methods like encryption. Lastly, data can be made less valuable by replacing highly sensitive components with placeholders through a method called "tokenization". Each of these methods has limitations, particularly when used in isolation. Firewalls can be breached, or an "inside threat" can effectively bypass access controls. Token repositories are high-value targets that can be hacked or otherwise compromised.

The most common method for data security, both at rest and in motion (i.e., as it traverses a network or components of a computer system), involve obfuscation through encryption whereby data is scrambled using a "key". Methods to decrypt this data, once acquired by an actor without the key, vary based on the complexity of the algorithm used. In all cases, it is presumed that the actor has the full set of encrypted data, making access to a decrypted copy a function of time and the amount of computational capability employed. As computers have increased in speed, the ability to decrypt files secured by encryption becomes an ever-shorter length of time. There is generally no expectation that computer speed will do anything but continue to increase. This makes encryption a suitable method for slowing down an attacker but doesn't prevent the attacker from accessing the data.

Methods to break data files into logical chunks, often called "shards", have existed for many years. They are typically employed in storage and data transmission environments to improve performance by allowing different shards to be moved or accessed simultaneously and recombined in well-defined ways. Simultaneously fetching multiple shards of a file can increase throughput by running performance-constrained parts of a system (e.g. disk i/o) in parallel. This technique can also improve resiliency if multiple copies of the same shard are made and geographically dispersed, but the size of the shards, the lack of intentional distribution over a large, mixed "attack surface", and the relative ease of reassembly make it ineffective for securing data.

More recently, data fragmentation has emerged as a technique to either obscure data though continuous relocation, or through allowing multiple encryption algorithms to be used within a file. These techniques are forms of obfuscation, and do improve security, focusing primarily on data at rest. Critically, however, they do not focus on obscuring the data by creating shards that are so small as to be meaningless and by intentionally disordering and mapping them to a large and diverse number of physical locations that frustrate attempts to find and reassemble the data.

US Patent Publication 20160342608, assigned to CryptoMove, Inc., discloses generating multiple obfuscated and partitioned data files from the original source data. U.S. Pat. Nos. 9,292,700 and 9,842,217 (continuation), both assigned to the Atomizer Group, LLC., disclose randomly fragmenting the data into a plurality of Atoms of at least one bit in length created from non-contiguous bits from the original data by using various masks. The data is first encrypted before it is randomly fragmented. None of these references discuss setting a maximum size for the partitioning of the data files and do not create shards small enough or in a way that meets the needs of fragmentation below the level of an atomic unit of valuable data

SUMMARY

Widely distributing microshard data fragments amongst separate computers, servers, folders and files and intermixing them with other microshard data fragments, requires an attacker to (i) know all places that microshard data fragments exist, (ii) to gain access to all of those places, and (iii) to know or deduce how to reassemble the microshard data fragments in a meaningful way (i.e., the correct order). This is analogous to trying to reconstitute a cup of coffee after drops of it have been mixed into random swimming pools across the country. Proposed is a system, apparatus, and method to fragment data into small enough shards so each microshard data fragment has diminished material value, and then to randomly distribute them in a way that they are intermixed with independent shards related to other data, information or content. The size of a microshard data fragment is selected so that if one microshard data fragment is obtained by itself it will contain limited useful information. This makes the data less understandable (that is, obfuscation) while simultaneously making each microshard data fragment less valuable (as it may be meaningless piece of data by itself). When widely distributed, it also incorporates elements of making the data less accessible. In combination, the data is far more secure.

Microshard data fragments can be a fixed size or variable, and their sizes can be tuned to balance performance with the degree of security desired. Variable sized microshard data fragments may exist within a single file, or the size of the microshard data fragments may vary from one source file or data set to another based on the contents and security requirements. It is possible that the size of each microshard data fragment could change over time; for example, a 10 bit microshard data fragment may be broken into two, 5 bit microshard data fragments when certain factors are achieved.

In addition to a system that utilizes microshard data fragments, proposed are systems and methodologies that (i) manage a set of pointers as reassembly keys, (ii) add meaningless microshard data fragments that "poison the well", (iii) intentionally intermix valid microshard data fragments from multiple source data and (iv) intentionally disburse microshard data fragments over a maximally practicable number of local and/or remote destinations, further decreasing the value to a would-be attacker who is capable of retrieving one or a few shards. Further proposed are methodologies for tokenizing one or more parts of the pointers and for meaningless data to also be added to the mapping files and pointers, in addition to adding meaningless microshard data fragments, individually and collectively devaluing every element of the system if compromised or intercepted.

Finally, the amount of meaningless data added to each component of the system (microshard data fragment itself, mapping between a complete data set and pointers to microshard data fragments, and mapping files containing tokens that represent locations) can be tuned to balance the size of the data footprint, at rest or in motion, with the degree of security desired.

In addition to the amount of meaningless data, the following factors contribute to balancing the system; decreasing the size of microshard data fragments tends to increase the size of the pointer repository. The resulting pointer repository size is affected by the ratio between the size of the microshard data fragments and the pointer size. Additionally, the more remote destinations, (e.g. files and hosts) the more computational complexity and potentially memory needed to reassemble microshard data fragments on retrieval (based on things like operating system threads, the need to reorder microshard data fragments that arrive out of sequence, etc.). Finally, the performance optimizations can themselves be tuned based on the type of incremental indexing used, the size of a page loaded from the pointer repository, the size of pages used to reassemble microshard data fragments, and the size of prefetched blocks. Each of these has implications for performance and the efficient use of memory and processing power.

The disclosed embodiments allow a user to set the maximum size of microshard data fragments. The size may be below the level where valuable data may be contained or may be larger than this level if the potential risk of obtaining valuable data is within an acceptable range. The use of the larger level has value in that there may be a statistically low enough percentage of microshard data fragments that contain a significant amount of the valuable data.

BRIEF DESCRIPTION OF THE DRAWINGS

Aspects of the present disclosure are illustrated by and are not limited by the accompanying drawings and figures.

FIG. 2 illustrates an example fragmentation of the data file of FIG. 1 into microshard data fragments, according to one embodiment.

FIG. 4 illustrates an example of a pointer repository that is comprised of a set of pointers associated with the fragmentation of FIG. 2, according to one embodiment.

FIG. 5 illustrates an example of a token repository that defines portions of the full pointers (of the pointer repository of FIG. 4) to microshard data fragments, according to one embodiment.

DETAILED DESCRIPTION

Described herein is a system that involves one or more computers using software or hardware that takes source data (more completely defined below) being (i) written dynamically as a stream to storage (e.g. a database file being continuously written), (ii) streamed to a remote system or (iii) persisted (either on a disk or in memory) and breaks the data into microshard data fragments. Microshard data fragments are units of data that may (but do not have to) vary in size and whose maximum size, in one embodiment, is set by a user or program to be smaller than would be valuable should the microshard data fragment be accessed by an unauthorized actor.

Figure 1:
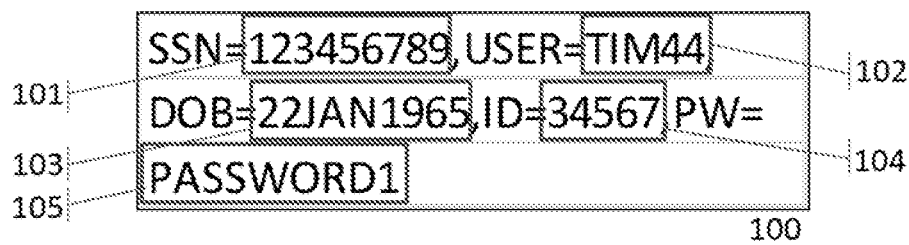
FIG. 1 illustrates an example data file that defines details of an account comprised of various fields using commas as delimiters, according to one embodiment.

FIG. 1 illustrates example entries in a data file 100 (i.e., source data) that might hold user account information in a plurality of comma delineated fields. As illustrated, the fields include social security number 101, user name 102, date of birth 103, user identification number 104 and password 105. The encircled blocks of information for each of the fields 101, 102, 103, 104, 105 being the data that would likely be considered sensitive and worthy of protection. At least 5 characters (which may be captured in 5 bytes) of information (e.g., minimum field size for user 102 and password 104) would need to be intercepted in order to possibly reconstruct a valuable piece of information. Therefore, to completely avoid this concern, a size of 4 characters (bytes) could be set as the maximum size of a microshard data fragment.

FIG. 2 illustrates an example of how the data file defined in FIG. 1 might be split into such 4 character fragments, with no microshard data fragment containing sufficient data to be of value. This novel ability for the user or data owner to set the microshard data fragment size allows for a balance between the desired level of security and system performance.

In an alternative embodiment, the maximum microshard data fragment size could also be set so that the probability of having many valuable data elements and contextual information contained in microshard data fragments is sufficiently reduced to meet a given risk tolerance. Increasing the size of the microshard data fragment reduces the total number of microshard data fragments and thereby the size of a necessary pointer repository 400. For example, if a valuable data element contained in the user data is represented in 9 characters (bytes) (e.g. a social security number) and the associated label is 4 characters (bytes) (e.g., "SSN=") then a total of 13 characters (bytes) would be required to fully gather the necessary information (i.e., the label plus the social security number). Accordingly, increasing the size of the microshard data fragments to, for example, 12 characters (bytes) may produce a microshard data fragment that includes, for example, the label and only a portion of the social security number or the whole social security number and not all of the label. Additionally, increasing the size of the microshard data fragments to, for example, a number greater than 12 characters (bytes) will reduce the frequency that contiguous locations will contain the entire label and value versus the original source data.

Microshard data fragments may still be encrypted with one or more algorithms. This can be accomplished utilizing one or more known methods that are implemented by hardware or software or by the underlying storage and network environments.

Figure 3:
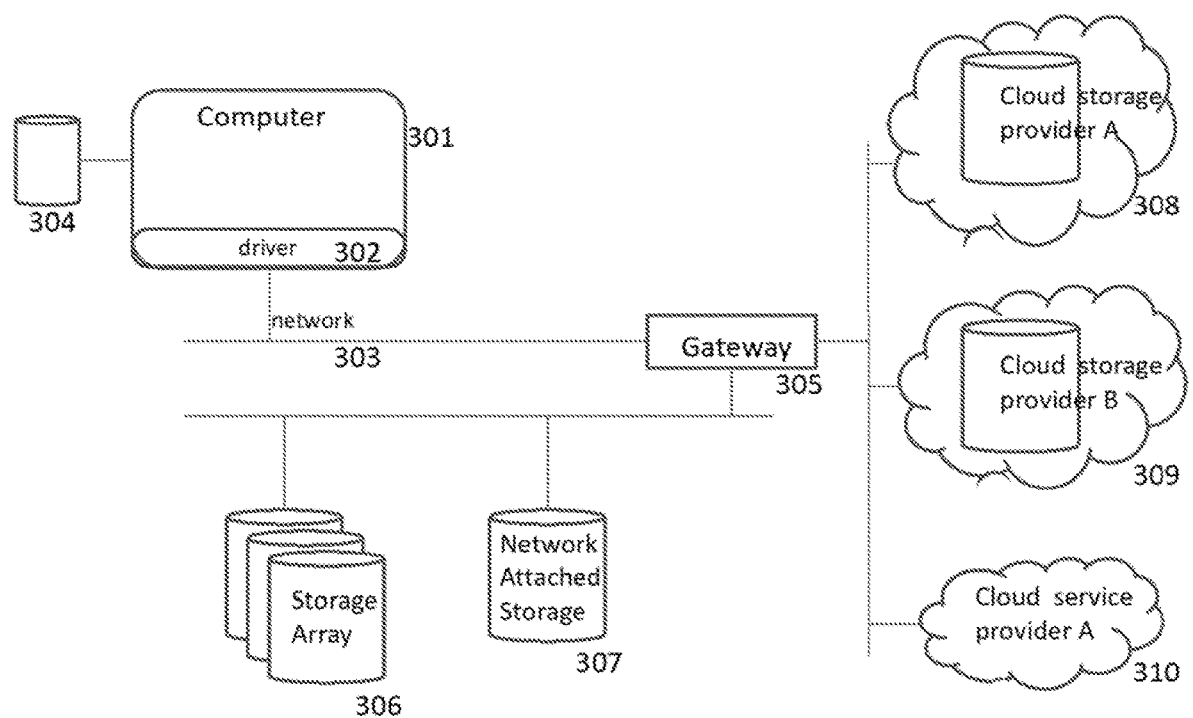
FIG. 3 illustrates an example networked architecture that may be utilized to allow sufficient dispersion of microshard data fragments in a non-orderly manner, according to one embodiment.

Microshard data fragments may be geographically dispersed. FIG. 3 illustrates an example system 300 (networked architecture) that can be utilized to disperse microshard data fragments. When at rest, this dispersion may be in non-contiguous locations such as on a local hard drive 304, across multiple network attached storage devices 307, across multiple storage arrays 306, across multiple "cloud" storage devices and service providers 308-310, or any combination of the above (individually and collectively referred to as "storage resources"). When in motion, geographic dispersion takes the form of one or more network adapters, physical or virtual, and network segments or paths 303, potentially with the microshard data fragment transmitted in a non-contiguous sequence. In one embodiment in which the computer 301 is performing the microsharding function, a multitude of network interfaces and drivers 302 might connect the computer to multiple networks 303. Policies within the computer 301 or network gateway 305 can be used to ensure that microshard data fragments from a single source file or data stream or user data (collectively the "source data") are routed over varying network paths on their way to their destinations 306-310. In one embodiment, adjacent microshard data fragments from source data are not sent on the same network path or to the same destination. This limits the ability of an attacker to eavesdrop on a network segment and capture potentially ordered microshard data fragments as they are written or read. In other embodiments the act of creating microshard data fragments and reassembling them may occur in the network gateway 305, which might present one or more virtual disks to the computer. In these embodiments, gateway 305 might have multiple network interfaces and routing policies to frustrate would-be eavesdroppers.

A further aspect of the present invention is a computing device, such as a laptop, server or other electronic device 301 or gateway appliance 305, running a software program or driver 302 or hardware that creates and manages a set of pointers to each of the microshard data fragments which enables splitting the original user "source data" (or content) into microshard data fragments and being able to reassemble microshard data fragments back to the original content. These pointers serve a function analogous to encryption/decryption keys, associate a set of pointers with a file name or other identifier, and may be generated dynamically as the original content is broken into microshard data fragments. A set of pointers is required to fetch the microshard data fragments and reassemble them in the correct order to recreate the original data.

FIG. 4 illustrates an example pointer repository 400, associated with a file named "ACCOUNT" (e.g., source data of FIG. 1) identifying where the microshard data fragments are stored. Each pointer includes the information necessary to identify where the particular microshard data fragment is stored (and can be recovered from). The pointer repository 400 may include the microshard data fragment number 401 (e.g., MSDF1, MSDF2, etc. from FIG. 2), a location where the microshard data fragment is stored 402 (e.g., 304, 306-310 from FIG. 3), a file or path identifier at that location 403, and an index or offset into said file or path 404.

The system defined in FIG. 3 may dynamically create, write, fetch and reassemble the microshard data fragments, using the pointers, as source data is accessed by a computer or other device. As computer 301 seeks to access the file "ACCOUNTS" local driver 302, hardware and/or a network attached gateway appliance 305 uses pointer file 400 to dynamically fetch the data and reassemble it. Creating or updating a data file follows a similar process in reverse, updating the pointers as needed.

Figure 9:
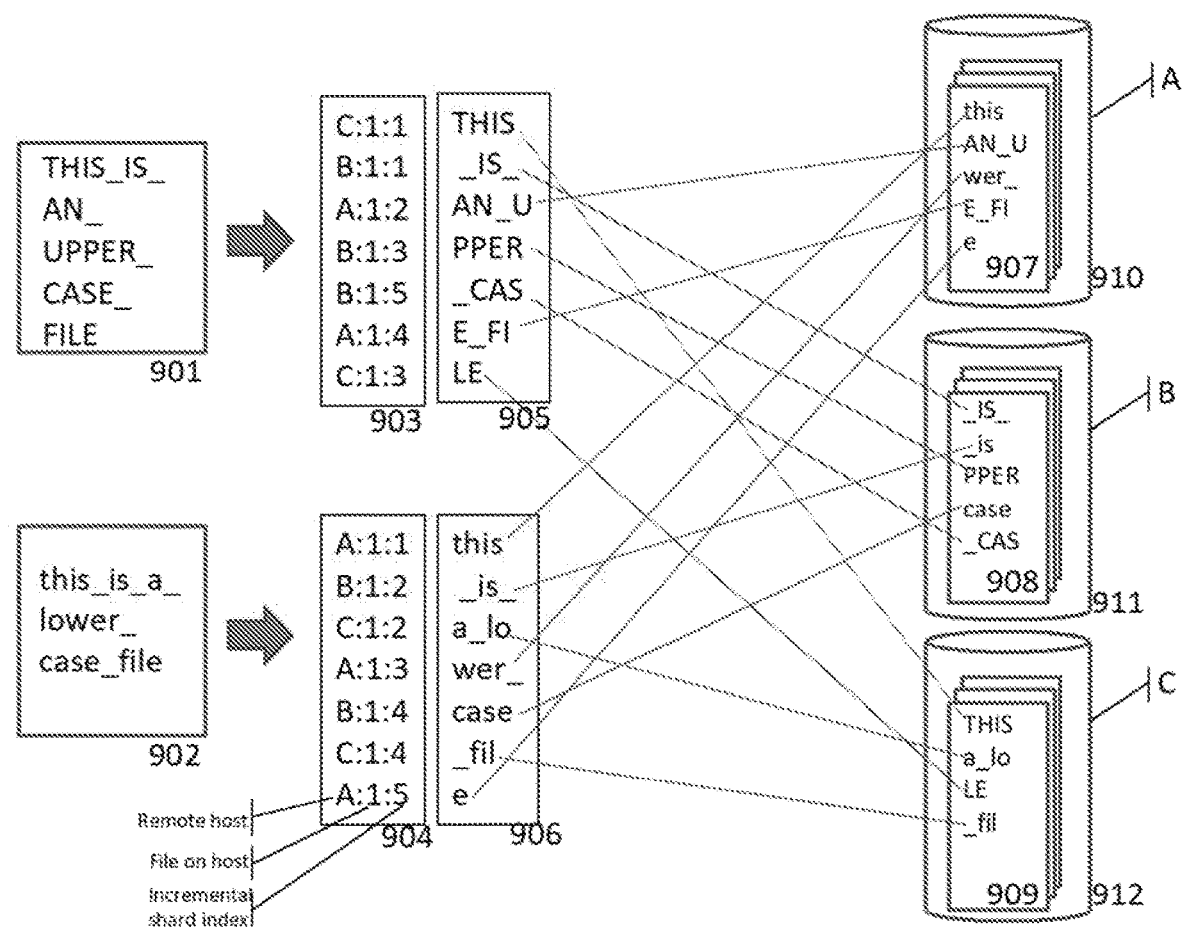
FIG. 9 illustrates an example of two separate source data that are broken into microshard data fragments and distributed to three remote storage devices, showing how the resulting data is intermingled, according to one embodiment.

FIG. 9 illustrates an example of how source data may be broken into microshard data fragments and distributed across multiple storage resources. Example files 901 and 902 are broken into a plurality of 4 character (byte) microshard data fragments as illustrated by elements 905 and 906 in this embodiment. The microshard data fragments are then stored across a plurality of remote storage resources 910, 911, 912. Pointer entries, defining where the microshard data fragments are stored, are created for each of the files 901, 902 and stored into a pointer repository. The values of the entries from the pointer repository are illustrated by elements 903 and 904.

Each of elements 903, 904 define pointers for the microshard data fragments that define the host, a file on the host and an incremental shared index defining where in each file the microshard data fragment will be stored.

As illustrated, each remote storage resource 910, 911, 912 includes a plurality of files 907, 908, 909. For ease of illustration, each of the pointers has the associated microshard data fragments being stored on a first file (top one as illustrated) as indicated by the "1" in the pointer repository 903, 904. By way of example, the portion of pointer repository 903 shows that the first microshard data fragment as illustrated by element 905 "THIS" is stored in remote storage C 912 on the first file 909 and is the first micoshard data fragment stored therein (top of the list). The second microshard data fragment contained in element 905, "_IS_", is stored in remote storage B 911 on the first file 908 and is the first microshard data fragment stored therein (top of the list). The third microshard data fragment contained in element 905, "AN_U", is stored in remote storage A 910 on the first file 907 and is the second microshard data fragment stored therein (after the first microshard data fragment contained in element 906, "this").

Referring back to FIG. 4, the remote host 402 of microshard data fragment number 401 may be defined by a token rather than an actual storage resource. FIG. 5 illustrates an example mapping file or repository 500 that maps the tokens to actual storage resources. The tokens may represent, in one embodiment, the name or address of the physical system. Similar tokens can be used to represent one or more of the storage location, path, or cloud provider at which one or more microshard data fragments reside. If such a tokenization is used, then the mapping repository 500, in one embodiment, is stored remotely from where the pointer repository 400 are persisted, and is used to combine with the pointers to identify the true location of the microshard data fragments.

All or a portion of the pointer repository (e.g., 400, 903, 904) may be stored remotely from some or all of the microshard data fragments. If remote, they are delivered on-demand at the time they are needed, and may be cached locally. Any well-known protocol may be used to securely authenticate and access remotely stored information.

Intercepting any of the pointers from pointer repository 400 defined in FIG. 4 without the required token mapping from token mapping repository 500 defined in FIG. 5 would be of limited value as the locations of the systems or storage to access would be hidden from view. Similarly, if the token mapping repository 500 of FIG. 5 is intercepted without the pointers defined in the pointer repository 400 of FIG. 4 then only the names or addresses of systems containing the microshard data fragments are known, but not their locations within those systems of the specified microshard data fragments, or their relationships to the original data. Intercepting the microshard data fragments from any single disk, server, or network segment (for example from any of 303, 304, 306-310) is of little value as none contain valuable data, and their reassembly is made difficult based on the degree of geographic dispersion, any intentionally disordered sequencing, and the number of other unknown systems that must be compromised to attempt to reassemble a complete data set.

An outgrowth of having many microshard data fragments, each with a separate pointer, is that the size of the pointer repository 400 and 607 may be significant. At some logical point, the size of each pointer (i.e., the number of bytes needed to represent a pointer) is large relative to the size of each microshard data fragment thus creating a system with substantial storage overhead. For example, should we need a 4 byte pointer to address an 8 byte microshard data fragment, the entries in the pointer repository that describe reconstructed source data would be half the size of the original source data. In total, the entire pointer repository would be half of the sum of the size of all the source data that have been written, thus requiring a large disk to store the pointer repository. One key factor to achieve an efficient system is to minimize the ratio between the pointer size and the microshard data fragment size. Some identified methods to minimize the size of pointers include label substitution, computation, and incremental indexing.

Token repository 500 of FIG. 5 shows tokenization or label substitution that is achieved by using a relatively small label to identify which remote host (FIG. 3, 306-310 and FIG. 9, 910-912) a microshard data fragment is on. The label can be defined in fewer bits than using the host name, IP address or a file descriptor. In a typical system, a remote host or storage resource 306-310 or 910-912 might be referenced by a textual "hostname" or IP address, with an IP address generally consuming the least amount of space. Efficiently stored IP version 4 addresses are typically encoded in a 32 bit, base 16 ("hexadecimal") number, so the address 192.168.0.100 can be reduced to and stored as the hexadecimal number C0A80064. Further adding a filename and path on said remote host or storage resource only serves to lengthen the 32 bit IP address, but is needed for a pointer to identify the physical location of the file in which a microshard data fragment was written. With label substitution, the address of each remote host or storage resource, and potentially each file on those systems, can be stored only once in a mapping file and given a short label to reference it in each pointer.

The use of short labels as, for example, a 4 bit "Host ID" is described in more detail with respect to FIGS. 7 and 8 below. In such a case the repeated storing of the 32-bit address plus optional file identifier has been reduced to a single entry, with only 4 bits stored in each pointer to a microshard data fragment. Note that in this example, the use of 4 bits suggests a maximum of 16 remote hosts or storage resources (whose labels are simply identified as remote systems 0-15), though any number of bits that is less than 32 will achieve the objective of shortening the pointer.

An additional approach to storing a portion of a remote file location, for example the file name or identifier, is to compute said file identifier on a remote host rather than store it ("computation"). This gives the luxury of having many files, even with a relatively smaller number of remote hosts or storage resources, which do not require space in pointers to identify them. The file identifier must be derived from random values to be unpredictable.

In one embodiment of this approach, there are 16 remote hosts and storage resources, each with 100 files (numbered from 0-99) into which microshard data fragments may be written. Each time a microshard data fragment is created from a source file or data stream or user data, we randomly select the Host ID (from 0-15) on which it will be stored. The pointer associated with the immediately preceding microshard data fragment from the same source data (or, if this is the first shard of said source data, the randomly selected Host ID for this pointer) is fed into a one-way mathematical hashing function, whose output is then mathematically manipulated using a modulo function to produce a result from 0 to 99. This corresponds to the file number shown in FIG. 4 (e.g., "FILE 4") and the "file on host" in FIG. 9, 903-904, on the randomly selected HostID into which the current shard will be written. As this file number can always be re-computed if one knows the pointer to the prior microshard data fragment for a given source data, the file number need not be stored in the pointer repository, but the number of potential destinations has increased from 16 hosts to 1600 host:file combinations Another embodiment to reduce the size of the pointers is to use incremental indexing. In this approach, one defines the index portion of the first pointer from a given source data to be written (or retrieved) in each remote file or storage resource as the absolute number of bytes or, in one embodiment, absolute number of microshard data fragments from the beginning of a remote file. Subsequent microshard data fragments from this same source data that are stored or written to this same remote file may be addressed by an incremental value from the pointer previously used for the previous microshard data fragment. For example, if the first pointer from a given source data input on a remote file was stored at offset of 8000 bytes and the next microshard data fragment to be stored in the same remote file is to be written at a location at an offset of 8056 bytes, the location is only 56 bytes after the prior one. If the shard size is fixed at 8 bytes, the incremental index is 7 shards after the prior one. We can store the index of the second microshard data fragment pointer in the shard pointer repository as an incremental 7 instead of 8056. The incremental value 7 fits in 3 bits instead of 13 bits needed to hold the absolute value 8056.

One format for a pointer repository 400 that uses a combination of label substitution and incremental indexing to reduce the size of the pointer repository may include the following ordered format: InputFilename: Schema, shardPtr1, shardPtr2, shardPtr3 . . . shardPtrLast Schema (e.g., "1") as represented in FIG. 4, is a 1 byte flag that specifies the version and format of the microshard data fragment pointers (shardPtrX) used for this InputFilename (the specific instance of source data in this example) and stored in pointer repository 400. Referring to FIG. 7 and FIG. 8, the first 4 bits in each shardPtr field represent the remote host using label substitution, which provides both smaller pointers and obfuscation to protect the data even if the shard pointer repository is compromised. In this embodiment, we can assume only one file exists on each remote host. In a preferred embodiment one of multiple files on that host can be identified through computation as previously described.

The next 4 bits in each shardPtr contain the index. FIG. 7 and FIG. 8 represent two alternative embodiments for defining the index. The intent of defining this on a per inputFilename basis is to allow extensible addition of other versions in the future, and to allow the system to choose which version to use for each data source (which could be statically configured or dynamically selected by the system at the time an inputFilename is first sharded).

Figure 7:
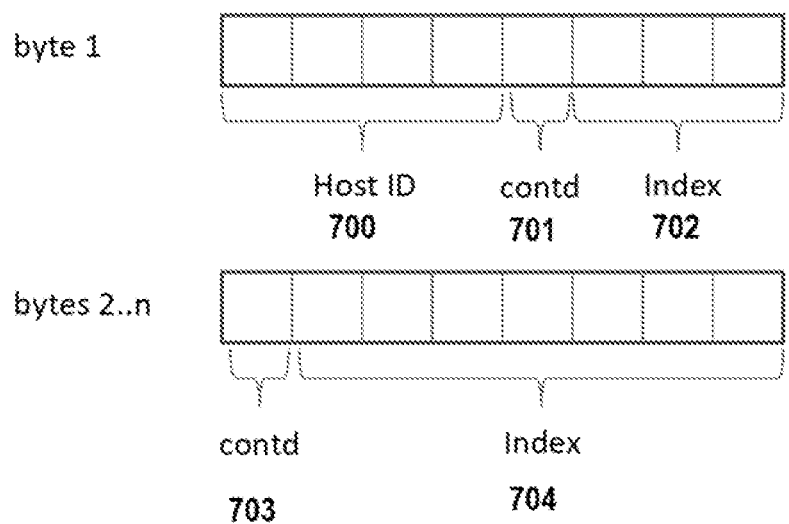
FIG. 7 illustrates an example pointer using incremental indexing, according to one embodiment.

FIG. 7 illustrates a first embodiment (Schema 1) for a microshard data pointer (e.g., ShardPtr1). As previously mentioned, the first 4 bits of the first byte define the remote host using label substitution 700. A continuation bit 701 and a 3 bit index value 702 complete the first byte. The Index value 702 (and potentially continued in 704) of ShardPtr1 is an absolute Index, expressed as the number of shards (not bytes) to index to the first shard in the given remote file. The use of 3 bits for the index value 702 enables $2^3$ (8) values to be defined (from 0 shards to 7 shards) in byte 1. The index value 702 may fit in these 3 bits if near, within 7 shards from, the beginning of the remote file. If not, the contd bit 701 is set to 1 and byte 1 contains the 3 highest order bits for the index value 702. The pointer then continues to be defined in further bytes (bytes 2 . . . n) that include a continuation bit 704 and a 7 bit index value 705. The use of bytes 2 . . . n, makes the pointer size extensible. The final octet describing a pointer will always have the contd bit set to 0.

In shardPtr2 . . . N, the absolute value in Index is replaced by an incremental value (relativeIndex). If the next shard to read or write on a given remote file for a given source data is within 7 shards of the prior one, then only 3 bits are needed for the value of relativeIndex and the entire shardPtr fits in a single byte. This will tend to happen more frequently if a relatively small number of input files are being written at the same time. More writes increases entropy (the intermingling of shards from unrelated source data), but will also cause the relative pointers after the first shard to tend to grow beyond a single byte. In most cases, it is expected that a shardPtr2 . . . N will be 1-2 bytes long The system reassembling source data from microshard data fragments needs to be able to determine where the file ends. For this reason, an "end of file" shard pointer is written after the final shard in the pointer repository. It has a value of 0 in the "contd" bit and 0 in the "Index" bits, effectively becoming "HostID:0". Note also that if an input file is small enough to fit into a single shard, and the shard happens to be the first shard in the remote file, the shardPtrs will be expressed in the database with the end of file delimiter as HostID:0,HostID:0. This is valid.

Schema 1 (illustrated in FIG. 7) is very efficient for systems that are moderately busy. In this example implementation, up to 1023 unrelated shards can be written into a remote file between adjacent shards for the same source data and the relativeIndex pointer (after the first shard) will fit in 10 bits, making the shardPtr only 2 bytes. If the system has very little other activity, the relativeIndex pointers will be small enough that the shardPtr is a single byte.

For systems that are lightly busy, it may be more common to find that adjacent shards from a single source data input have more than 7 but less than 15, unrelated shards between them. In this case, a shardPtr is likely to require 2 bytes simply because a bit was used by the contd bit. The same is true in very busy systems where adjacent shards have more than $2^{10}-1$ (1023) but less than $2^{11}-1$ (2047) unrelated shards between them (requiring a third byte to fit the relativeIndex)

Figure 8:
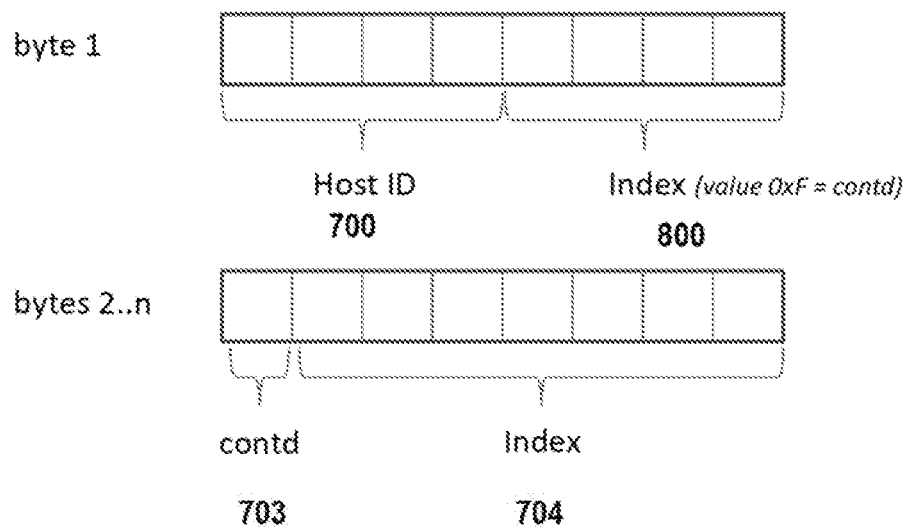
FIG. 8 illustrates an example pointer using incremental indexing, according to one embodiment.

FIG. 8 illustrates a second embodiment (Schema 2) for a microshard data fragment pointer (e.g., any pointer, such as ShardPtr1). As previously mentioned, the first 4 bits of the first byte define the remote host using label substitution 700. Schema 2 uses bits 5-8 800 with a particular value (e.g., 0xF) being reserved to indicate that the Index value is continued (actually started) in the next byte (byte 2). This provides the ability for the first byte to define the index as up to $2^4-1$ (15) values (from 0 to 14 shards) and reclaim most of the values lost to the contd bit in schema 1 by reserving a value of 0xF to indicate that the Index value is continued in the next byte. One downside to schema 2 is that if the adjacent shards are separated in a remote file by more than 14 unrelated shards a second byte is required to hold the index value, and a two byte shardPtr can only accommodate shards that are $2^7-1$ (127) apart before requiring a third byte. Systems that have low activity will benefit from schema 2 as they are more likely to only need a single byte for the shardPtr. If the system is doing many simultaneous writes of different source data inputs, the probability increases of needing 3 byte shardPtrs. In such a case, schema 1 may make more efficient use of space in the pointer repository.

A further aspect of the invention is a computer running software to obfuscate valid data by adding meaningless information. This information may be in the form of meaningless microshard data fragments, meaningless pointers (also referred to as "pseudo pointers") that do not represent legitimate source data, and meaningless mapping tokens that specify unused locations. The system can vary the amount of meaningless data relative to valuable data, depending on the desired space efficiency vs security. In one embodiment, this can be accomplished by having the host or gateway that creates the microshard data fragments simply define a set of unused hosts in the host mapping file, and create unused source data input files containing randomized values. The unused source data input files are then processed according to the mechanisms described herein, at the same time as legitimate source data inputs are processed, ensuring that the meaningless data is commingled with real source data.

Finally, another aspect of the invention is a computer or other network attached system that uses one or more physical or virtual network interfaces and addresses to help manage the connections to microshard data fragments in local or remote files and to aid in reassembly. This might be accomplished by holding open multiple network "sockets" or "file descriptors" to the files or paths specified in FIG. 4 to more readily access microshard data fragments. These cached sockets or file descriptors would simply need to be accessed in the order specified with the appropriate index.

Microshard data fragments can be routed over one or multiple network interfaces (physical or virtual) and paths 303. While network interfaces are generally used to access remote data, the same technique can be used to connect to files on a local disk drive. Disparate network segments or paths can be used to prevent interception, and microshards can be intentionally disordered on a network segment or path as well as on a single storage resource.

An outgrowth of the large number of pointers to create, manage, and reassemble may be a system whose read and write performance of files is markedly lower than that of a system that doesn't create microshard data fragments. Aspects of the present invention are defined below to reclaim system throughput and create a computationally efficient system.

Figure 6:
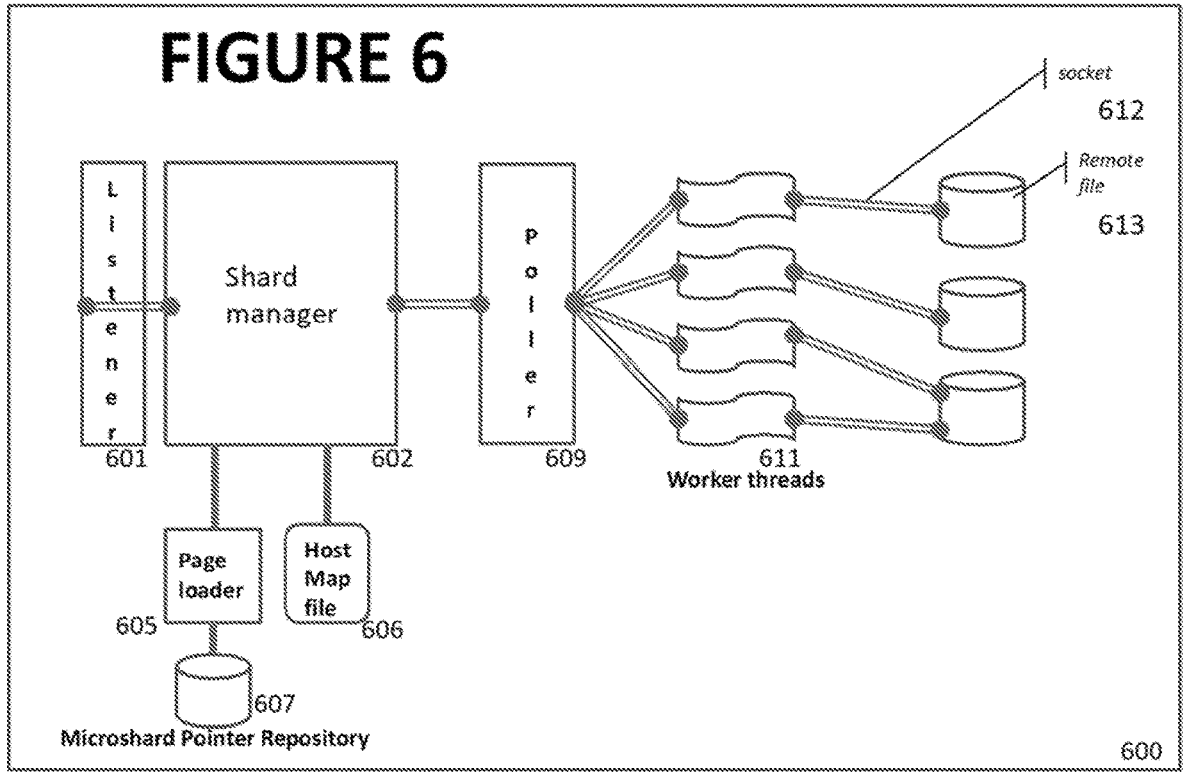
FIG. 6 illustrates functional components of an example system for performing operations that create microshard data fragments, according to one embodiment.

FIG. 6 illustrates functional components of an example system 600 for performing operations to create microshard data fragments. The system 600 includes a pointer repository 607, a host mapping file 606 stored separately from the pointer repository, a set of remote files 613 holding microshard data fragments dispersed across multiple systems and a shard manager 602 to create new microshard data fragments and to reassemble said data fragments into their original source data.

The performance implications of having to read and write a large number of pointers from and to the pointer repository 607 could be significant. Holding in memory the full set of pointers associated with the original source data could be resource prohibitive. Accordingly, one aspect of this invention is to introduce a page loader 605 that pre-fetches and caches pointers from the repository 607 not currently in use. In one embodiment, when writing microshard data fragments the page loader 605 can be used to cache one or more groups (pages) of pointers that need to be written to the repository 607 while new pointers are being created. On reading, the page loader 605 can fetch and cache the next group (page) of pointers needed to reassemble source data while other parts of the system simultaneously retrieve and reassemble a group of microshard data fragments described in the prior page. Operating in parallel reduces or eliminates the overhead of pointer repository reads and writes.

An efficiently performing system may also use parallel access to overcome the delays associated with having to create and reassemble the microshard data fragments. To do this we introduce poller 609 and worker threads 611 with simultaneous socket connections 612 to the remote files 613. As the shard manager 602 creates microshard data fragments, it passes them to poller 609 to cache and deliver to worker threads 611 that may be dedicated to each remote file. The same is true in reverse, requesting microshard data fragments to be fetched by multiple worker threads 611 simultaneously. This allows the microshard data fragments to and from remote files 613 to be written and read in parallel, decreasing the wait time normally associated with reading and writing sequentially and with network latency caused by having files stored remotely. It is analogous to parallel reading from and writing to disks for performance as found in a typical RAID system.

The performance impact of having to reassemble microshard data fragments that may arrive in a different order than desired, due to latency differences in accessing different remote hosts and storage resources, also needs to be mitigated. This is accomplished by creating a set of pages (locations in memory) for each requested data source into which to insert microshard data fragments as they are returned to poller 609. In one embodiment, poller 609 keeps track of a set of outstanding requests to get remote microshard data fragments from each worker thread 611 for each source data being reassembled. Returned values are placed in the appropriate open slots in the correct order as defined by the shard manager 602. When a complete, contiguous set of values are received without gaps, the page is returned to the shard manager 602. Note that in some embodiments the act of creating pages of data may be performed by the page manager 602 instead of poller 609. This aspect of the invention permits efficient handling of microshard data fragments in the likely event that they arrive out of order.

Additional efficiencies can be achieved by prefetching blocks of data from the remote files 613. Modern storage resources are optimized to read larger blocks of data, and most network protocols enforce a minimum message size of 64 bytes (anything less than that is filled in with meaningless "padding" bytes). This results in significant time and compute overhead associated with reading and transferring a single, relatively small microshard data fragment from remote file 613. While microshard data fragments in remote files 613 are intentionally misordered through dispersion across multiple files and disks and through intermingling microshard data fragments from meaningless data or other source data, the incremental indexing described above implies that microshard data fragments associated with a given source data will still be placed in the order they need to be retrieved from each remote file 613. That allows, in some embodiments, a significant efficiency in which worker thread 611, when asked to fetch a microshard data fragment from remote file 613, can request a larger block of data at little to no incremental cost. The additional data returned can be cached by worker thread 611 and used to return subsequent requests for microshard data fragments associated with the same source data. As soon as a "cache miss" occurs, the worker thread may confidently flush any unfetched data from the cache as subsequent requests associated with the same source data will also not be present in the current block. In some embodiments, a similar process of caching blocks of writes can occur.

As source data are deleted, the inevitable result will be remote files 613 with gaps or "holes". This creates inefficiencies in the size of the remote files and in the performance of fetching data when data blocks are prefetched. To alleviate this issue, a cleanup process can be run during periods of relatively low activity. This process is analogous to "disk defragmentation", in that microshard data fragments are relocated within the remote files, pulled forward to fill any holes. Newly created holes vacated by a moved microshard data fragment will subsequently be filled in by a later microshard data fragment. This periodic maintenance ensures efficient file sizes at remote files 613 and increases the probability of cache hits with the block reads described above.

Example of One Implementation of the Underlying Technology

For data at rest, a computer or software may break files into several microshard data fragments and distribute them to multiple locations or files on the local disk. The disk and/or the shards could then be encrypted. Some or all the pointer file describing how to reassemble the microshard data fragments could then be remotely stored on another system or in a secure cloud service provider and accessed dynamically when a file needs to be read. When a valuable data file is written (created initially or updated), the pointers are created or updated. If using a single computer 301 with local storage 304 the pointer file in FIG. 4 may be cached in memory but would not be persisted on the local disk. All or part could instead reside in a remote service as shown in 310 for a cloud service, or in a similar service on another system or computer onsite.

For greater security, the microshard data fragments could be spread across multiple disks on multiple computers, network attached storage devices, storage arrays, or cloud providers (FIG. 3, 306-310 and FIG. 9, 910-912). If the microshard data fragment is remote, the pointers that map a file identifier or name to a set of pointers can be persisted locally or held remotely.

A token file 501 can be employed so that the pointer file 400 does not contain valid names or network addresses of the systems holding data. The token file can be remotely stored on another system or in a secure cloud service provider, kept separate from the pointer file, and accessed dynamically when a file needs to be read.

Meaningless microshard data fragments can be inserted on one or more persistent storage resources, meaningless or pseudo pointers added that represent non-existent file mappings, and meaningless tokens placed in the token file to misdirect an attacker who receives a copy of the token file as to where microshard data fragments are stored.

Accessing microshard data fragments can be done sequentially or in parallel (to improve performance). When storing local microshard data fragments non-sequentially and distributed throughout multiple files, unauthorized access to the local disk 304 is frustrated by the complexity of reassembly, even if no additional remote storage is used For data in transit, one or more network interfaces may be employed to route microshard data fragments over disparate network paths 303 to minimize the potential of intercept. Software and policy routes may further be used to randomly change the network path or to ensure that data traveling to remote hosts and storage resources take diverse paths to inhibit interception of a file while being written.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A method for increasing data security of a first source data, having a plurality of data elements, executed by a system comprised of at least one computer in communication with a plurality of separate storage resources including at least a subset of (i) computers, (ii) servers, (iii) cloud storage devices and (iv) other storage devices, the method comprising the steps of:
(a) securing the first source data by:
predetermining, based on one of user input and computed value, a maximum size of a microshard data fragment, wherein a size of a single microshard data fragment is less than the predetermined maximum size,
splitting the first source data into a plurality of microshard data fragments, wherein (i) the plurality of microshard data fragments contain one of encrypted and unencrypted data and (ii) a size of the plurality of microshard data fragments is determined such that a ratio of the size of the single microshard data fragment divided by the predetermined maximum size is less than one,
selecting one of the plurality of microshard data fragments,
determining a pointer value which defines at least one of (i) a location for one of the plurality of storage resources, (ii) a file on the one of the plurality of storage resources, and (iii) a location in the file, where the one of the plurality of microshard data fragments will be stored,
storing the one of the plurality of microshard data fragments in the location defined by the pointer value,
storing at least part of the pointer value in at least one pointer repository, wherein at least a subset of the pointer repository is stored in a distinct storage resource that does not include the microshard data fragments, and
repeating the steps of (i) selecting one of the plurality of microshard data fragments, (ii) determining a pointer value, (iii) storing the one of the plurality of microshard data fragments and (iv) storing at least part of the pointer value until the plurality of microshard data fragments are stored, wherein a subset of the plurality of microshard data fragments stored in contiguous locations are (a) selected from non-adjacent locations in the first source data and (b) are intermixed so that the subset of the plurality of microshard data fragments are stored adjacent to microshard data fragments from a second source data, and
(b) reconstructing the first source data by:
receiving at least the part of one of the pointer values from the at least one pointer repository,
receiving one of the plurality of microshard data fragments from the location represented by the one of the pointer values,
placing the one of the plurality of microshard data fragments in at least one location created to reconstruct the first source data, and
repeating the steps of (i) receiving at least the part of one of the pointer values, (ii) receiving one of the plurality of microshard data fragments, and (iii) placing the one of the microshard data fragments in one of the locations created to reconstruct the first source data until the microshard data fragments have been reconstructed into the first source data.

2. The method of claim 1, further comprising obfuscating valid data by at least one of:
creating a pseudo pointer value and storing some or all of the pseudo pointer value in the at least one pointer repository, and
creating a pseudo microshard data fragment which is not part of the first source data and storing the pseudo microshard data fragment in the location defined by the pseudo pointer value.

3. The method of claim 1, wherein the pointer value includes a token that references at least a portion of the location of where a corresponding microshard data fragment is stored and wherein said token is stored in a token repository separate from the at least one pointer repository.

4. The method of claim 1, wherein the first source data is a stream of data that is being continuously updated as microshard data fragments are being stored.

5. The method of claim 1, wherein at least a portion of the pointer value for a next microshard data fragment is calculated by applying a mathematical hashing function to at least a portion of the pointer value for a preceding microshard data fragment to determine part of the location where the next microshard data fragment will be stored.

6. The method of claim 1, wherein a portion of the pointer value represents an offset value from the location of a prior microshard data fragment from the first source data.

7. The method of claim 1, further comprising the step of fetching and caching, using a page loader routine, a future group of pointers while previously received microshard data fragments are being reassembled.

8. The method of claim 1, further comprising caching, using a page loader, at least one pointer value for future use while the pointer repository has available capacity.

9. The method of claim 1, wherein the subset of the plurality of microshard data fragments are intermixed by randomly distributing the subset of the plurality of microshard data fragments with the microshard data fragments from the second source data.

10. The method of claim 1, wherein a ratio of a size of the pointer value and a size of one or more of the microshard data fragments is below a threshold value.

11. The method of claim 1, wherein the predetermined maximum size changes based on security requirements associated with at least a portion of the content of the first source data.

12. A system for increasing security of a first source data, having a plurality of data elements, that includes at least one computer in communication with a plurality of separate storage resources including at least a subset of (i) computers, (ii) servers, (iii) cloud storage devices and (iv) other storage devices and a non-transitory computer-readable storage medium containing stored instructions that when executed by the at least one computer causes the at least one computer to:
 (a) secure the first source data by:
  predetermining, based on one of user input and computed value, a maximum size of a microshard data fragment, wherein a size of a single microshard data fragment is less than the predetermined maximum size,
  splitting the first source data into a plurality of microshard data fragments, wherein (i) the plurality of microshard data fragments contain one of encrypted and unencrypted data and (ii) a size of the plurality of microshard data fragments is determined such that a ratio of the size of the single microshard data fragment divided by the predetermined maximum size is less than one,
  selecting one of the plurality of microshard data fragments,
  determining a pointer value which defines at least one of (i) a location for one of the plurality of storage resources, (ii) a file on the one of the plurality of storage resources, and (iii) a location in the file, where the one of the plurality of microshard data fragments will be stored
  storing the one of the plurality of microshard data fragments in the location defined by the pointer value,
  storing at least part of the pointer value in at least one pointer repository, wherein at least a subset of the pointer repository is stored in a distinct storage resource that does not include the microshard data fragments, and
  repeating the steps of (i) selecting one of the plurality of microshard data fragments, (ii) determining a pointer value, (iii) storing the one of the plurality of microshard data fragments and (iv) storing at least part of the pointer value until the plurality of microshard data fragments are stored, wherein a subset of the plurality of microshard data fragments stored in contiguous locations are (a) selected from non-adjacent locations in the first source data and (b) are intermixed so that the subset of the plurality of microshard data fragments are stored adjacent to microshard data fragments from a second source data, and
 (b) reconstruct the first source data by:
  receiving at least the part of one of the pointer values from the at least one pointer repository,
  receiving one of the plurality of microshard data fragments from the location represented by the one of the pointer values,
  placing the one of the plurality of microshard data fragments in at least one location created to reconstruct the first source data, and
  repeating the steps of (i) receiving at least the part of one of the pointer values, (ii) receiving one of the plurality of microshard data fragments, and (iii) placing the one of the microshard data fragments in one of the locations created to reconstruct the source data until the microshard data fragments have been reconstructed into the source data.

13. The system of claim 12, wherein the first source data is a stream of data that is being continuously updated as microshard data fragments are being stored.

14. The system of claim 12, wherein at least a portion of the pointer value for a next microshard data fragment is calculated by applying a mathematical hashing function to at least a portion of the pointer value for a preceding microshard data fragment to determine part of the location where the next microshard data fragment will be stored.

15. The system of claim 12, wherein at least one portion of the pointer value defines location information with at least one of (i) a token that references at least a portion of the location of where a corresponding microshard data fragment is stored, (ii) a calculation from a portion of a preceding pointer value, and (iii) an offset value from a location of a prior microshard data fragment from the first source data.

16. The system of claim 12, wherein at least one microshard data fragment is comprised of pseudo data that is not part of the first source data.

17. The system of claim 12, wherein said at least one computer further comprises one of a plurality of worker threads and a poller having separate communication paths to each unique storage resource thereby allowing for the system to both store and retrieve microshard data fragments in parallel.

18. The system of claim 17, wherein the poller creates a set of pages for the data source that is being reassembled, wherein each page is comprised of a plurality of open slots to receive retrieved microshard data fragments from different storage apparatus.

* * * * *